United States Patent
Glade et al.

(10) Patent No.: US 10,506,762 B2
(45) Date of Patent: Dec. 17, 2019

(54) COMPUTER CONTROLLED HYDRAULIC CONDITIONER ROLL TENSIONING ADJUSTMENT

(71) Applicant: AGCO Corporation, Duluth, GA (US)

(72) Inventors: Mark M. Glade, Hesston, KS (US); Douglas R. Treffer, Newton, KS (US); Brendon C. Nafziger, Canton, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 16/037,513

(22) Filed: Jul. 17, 2018

(65) Prior Publication Data
US 2019/0029182 A1 Jan. 31, 2019

Related U.S. Application Data

(60) Provisional application No. 62/537,135, filed on Jul. 26, 2017.

(51) Int. Cl.
*A01D 43/10* (2006.01)
*A01D 61/00* (2006.01)
(Continued)

(52) U.S. Cl.
CPC .............. *A01D 69/03* (2013.01); *A01D 82/02* (2013.01); *F15B 1/033* (2013.01); *F15B 11/16* (2013.01);
(Continued)

(58) Field of Classification Search
CPC ...... A01D 34/015; A01D 34/04; A01D 69/03; A01D 43/102; A01D 43/10; A01D 43/107;
(Continued)

(56) References Cited

U.S. PATENT DOCUMENTS 4,546,599 A 10/1985 Cicci et al.
6,401,549 B1 6/2002 Ohlemeyer
(Continued)

FOREIGN PATENT DOCUMENTS

DE 19539143 A1 4/1997
DE 102016107360 A1 10/2017
(Continued)

OTHER PUBLICATIONS

UK Intellectual Property Office, International Search Report for related UK Application No. 1712704.4, dated Feb. 5, 2018.

*Primary Examiner* — Robert E Pezzuto

(57) ABSTRACT

In one embodiment, a system, comprising: one or more pairs of oppositely rotatable, laterally extending rolls, wherein for each pair, at least one of the rolls is moveable relative to the other of the rolls; a hydraulic circuit, comprising: a tensioner circuit comprising: for each pair of rolls, one or more pairs of hydraulic cylinders arranged in parallel, each configured to resist movement of the at least one of the rolls at a respective end of the at least one of the rolls; an accumulator arranged in parallel to the hydraulic cylinders; and plural control valves; and a computing system configured to cause the one or more pairs of hydraulic cylinders to adjust the resistance to movement of the at least one of the rolls of the respective pair of rolls by sending signals to one or more of the plural control valves.

19 Claims, 6 Drawing Sheets

(51) Int. Cl.
*A01D 69/03* (2006.01)
*A01D 82/02* (2006.01)
*F15B 11/16* (2006.01)
*F15B 1/033* (2006.01)
*A01D 57/28* (2006.01)
*A01D 57/12* (2006.01)
*A01D 34/04* (2006.01)

(52) U.S. Cl.
CPC .............. *A01D 34/04* (2013.01); *A01D 57/12* (2013.01); *A01D 57/28* (2013.01); *F15B 2201/51* (2013.01); *F15B 2211/50* (2013.01); *F15B 2211/50554* (2013.01); *F15B 2211/6309* (2013.01); *F15B 2211/6313* (2013.01); *F15B 2211/6653* (2013.01); *F15B 2211/7107* (2013.01); *F15B 2211/7128* (2013.01); *F15B 2211/78* (2013.01)

(58) Field of Classification Search
CPC .... A01D 43/08; A01D 43/085; A01D 43/086; A01D 82/02; A01B 63/32; F15B 1/033; F15B 11/16

USPC ... 56/10.2 A–10.2 H, 10.2 R, 16.4 C, 16.4 R
See application file for complete search history.

(56) References Cited

U.S. PATENT DOCUMENTS

| | | | |
|---|---|---|---|
| 6,584,755 B2 * | 7/2003 | Holtkotte | ............. A01D 43/085 56/10.2 B |
| 8,166,736 B2 | 5/2012 | Nickel et al. | |
| 8,220,234 B2 * | 7/2012 | Pruitt | .................... A01D 43/10 56/16.4 A |
| 9,043,955 B2 | 6/2015 | Nafziger et al. | |
| 9,648,809 B2 * | 5/2017 | Pruitt | .................... A01D 43/10 |
| 2005/0126147 A1 | 6/2005 | Nickel et al. | |

FOREIGN PATENT DOCUMENTS

| | | |
|---|---|---|
| GB | 2303039 A | 2/1997 |
| WO | 2015/183532 A1 | 12/2015 |

* cited by examiner

COMPUTER CONTROLLED HYDRAULIC CONDITIONER ROLL TENSIONING ADJUSTMENT

CROSS REFERENCE TO RELATED APPLICATION

This application claims the benefit of U.S. Provisional Application No. 62/537,135 filed Jul. 26, 2017, which is hereby incorporated by reference in its entirety.

TECHNICAL FIELD

The present disclosure is generally related to agricultural machines and, more particularly, windrower conditioner roll tensioning control.

BACKGROUND

Windrowers are equipped with one of several types of detachable headers having a cutter assembly (e.g., rotary or sickle-type) and one or more pairs of hydraulically-driven, oppositely rotating, conditioner rolls that are used to condition (e.g., crush, macerate) harvested crop material and deposit the conditioned crop material onto the ground as a swath or windrow. The conditioning process serves to facilitate drying of the crop material. The extent of conditioning is based in part on the tensioning of the conditioner rolls as administered using a hydraulic circuit. In general, the tensioning of the conditioner rolls is typically achieved at the header through manual adjustment of a shut-off valve and a switch to enable hydraulic fluid flow and subsequent control through activation of control valves of the hydraulic circuit. The control valves are electrically coupled to the switch and hydraulically coupled to hydraulic cylinders. The hydraulic cylinders are in turn coupled via a respective pivot assembly to opposing ends of at least one of the respective pairs of rolls to cause, upon the control of hydraulic fluid flow to and from the hydraulic cylinders by switching-activation of the control valves, an adjustment in resistance to movement of at least one roll of the pair relative to the other roll. In effect, the control of hydraulic fluid flow via operator manipulation of the shut-off valve, activation of the control valves via the switch, and shut-off valve manipulation permits the charging of pressure of an accumulator tank from a pumping source in the hydraulic circuit and the reduction in charge pressure of the accumulator (and release of flow into a reservoir). A pressure gauge coupled to the hydraulic circuit guides the operator in his or her adjustments.

BRIEF DESCRIPTION OF THE DRAWINGS

Many aspects of certain embodiments of the disclosure can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

Figure 1:
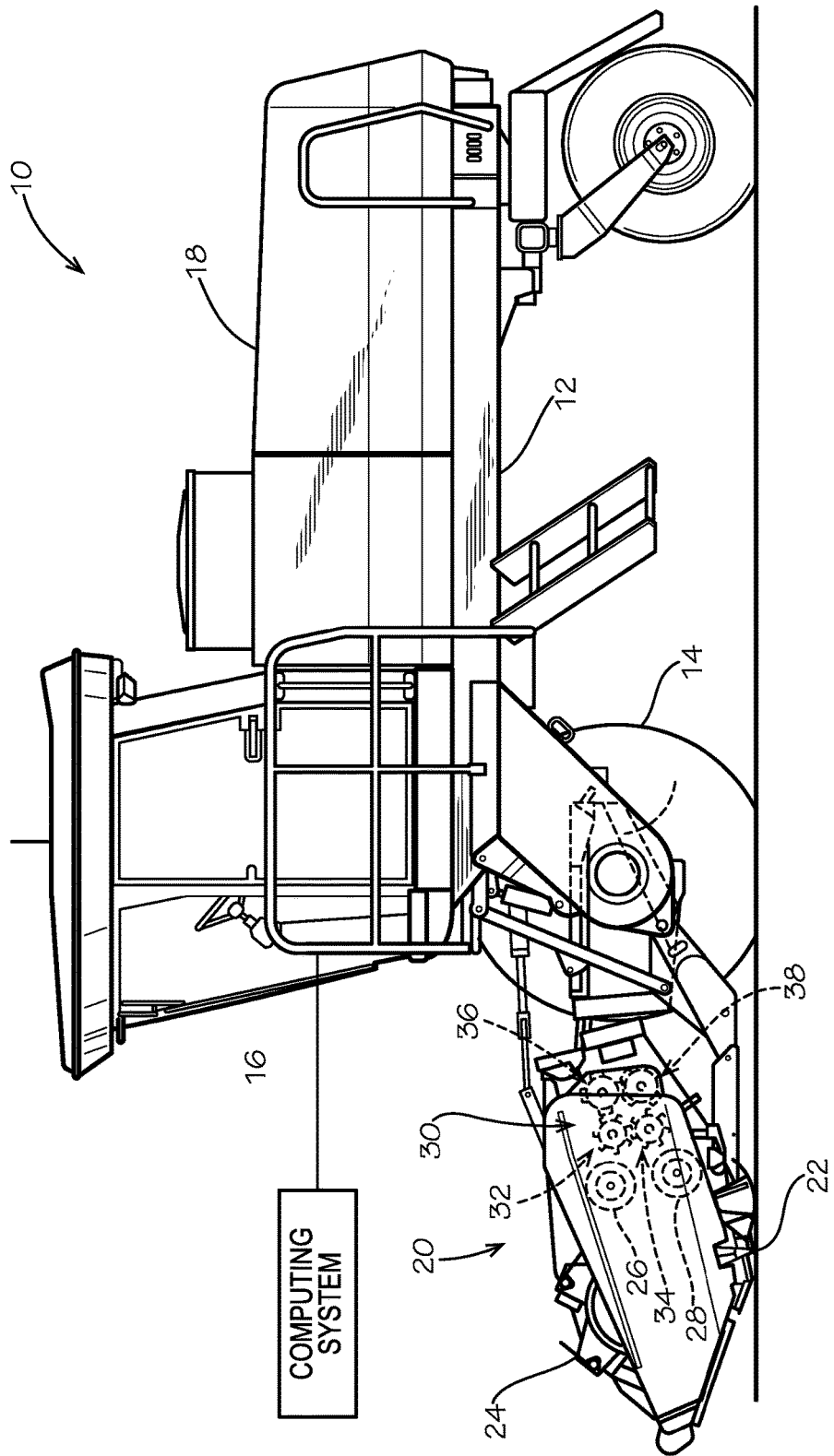
FIG. 1 is a schematic diagram that illustrates, in side elevation, partially cut-away view, an example windrower for which an embodiment of a computer-controlled, conditioner roll tensioning system may be implemented.

In one embodiment, a system, comprising: one or more pairs of oppositely rotatable, laterally extending rolls, wherein for each pair, at least one of the rolls is moveable relative to the other of the rolls; a hydraulic circuit, comprising: a tensioner circuit comprising: for each pair of rolls, one or more pairs of hydraulic cylinders arranged in parallel, each configured to resist movement of the at least one of the rolls at a respective end of the at least one of the rolls; an accumulator arranged in parallel to the hydraulic cylinders; and plural control valves; and a computing system configured to cause the one or more pairs of hydraulic cylinders to adjust the resistance to movement of the at least one of the rolls of the respective pair of rolls by sending signals to one or more of the plural control valves.

DETAILED DESCRIPTION

Certain embodiments of a computer-controlled, conditioner roll tensioning system and method are disclosed that automatically adjusts the tensioning (e.g., the resistance to movement) of the conditioner rolls to maintain a conditioner roll tension set point (e.g., hydraulic pressure set point). Aside from physically un-coupling or coupling a header to the windrower, operator involvement may be limited to, optionally, primarily tension (e.g., hydraulic pressure) set-point adjustment and activation of other procedures that implicate the computer-controlled, conditioner roll tensioning system from a cab of the windrower. In one embodiment, the computer-controlled, conditioner roll tensioning system comprises a computing system (e.g., a processor based system) that receives hydraulic pressure sensor input, compares the received hydraulic pressure sensor input to a default or user-defined hydraulic pressure set-point, and signals one or more of plural hydraulic valves to cause an adjustment in the resistance to movement of one of a pair of oppositely rotatable, laterally extending rolls based on the comparison.

Digressing briefly, conditioner roll tensioning is conventionally a manually intensive process that typically involves the operator leaving the cab and following a procedure that includes manipulating a shut-off valve (e.g., a ball valve) to enable hydraulic fluid flow and selecting a switch to enable an increase or decrease in pressure, as guided by observance of a pressure gauge, to hydraulically coupled hydraulic cylinders. The hydraulic cylinders are coupled via pivoting assemblies to at least one roll of one or more pairs of conditioner rolls, causing via pressure a resistance to the pivoting or radial movement of the coupled roll. As with many procedures, certain steps may be inadvertently omitted on any day of operation, resulting in insufficient tension on the conditioner rolls. Further, certain procedures involved in the operation of a windrower may be affected by conditioner roll pressure, which when unaddressed, make operations of the windrower complicated and burdensome on the operator. In contrast, by tying the conditioner roll tensioning process into a computing system network of the windrower, the tensioning process and other windrower processes are facilitated and made less error-prone, which may lead to more productive and efficient operations in the field.

Having summarized certain features of a computer-controlled, conditioner roll tensioning system of the present disclosure, reference will now be made in detail to the description of a computer-controlled, conditioner roll tensioning system as illustrated in the drawings. While an example computer-controlled, conditioner roll tensioning system will be described in connection with these drawings, there is no intent to limit it to the embodiment or embodiments disclosed herein. For instance, though emphasis is placed on a self-propelled windrower with a sickle-style header, certain embodiments of a computer-controlled, conditioner roll tensioning system may be beneficially deployed in self-propelled windrowers of other header designs (e.g., rotary style) or pull-type windrowers with headers of one of several known types. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Reference is made to FIG. 1, which illustrates an example windrower 10 for which an embodiment of a computer-controlled, conditioner roll tensioning system may be implemented. One having ordinary skill in the art should appreciate in the context of the present disclosure that the example windrower 10, depicted as a self-propelled windrower in FIG. 1, is merely illustrative, and that other self-propelled or pull-type windrower designs may be used, and hence are contemplated to be within the scope of the disclosure. The windrower 10 is operable to mow and collect standing crop in the field, condition the cut material to improve its drying characteristics, and then return the conditioned material to the field in a windrow or swath. The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 supports a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art. In some embodiments, other mechanisms for enabling navigation and/or traversal of the field may be used.

A coupled working implement, depicted in FIG. 1 as a harvesting header 20, is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a reciprocating sickle for severing standing crop from the ground, one or more rotating reels 24 for sweeping the standing crop into the sickle 22 to improve cutoff, and a pair of vertically spaced, oppositely rotating, full-length augers 26, 28 that converge the severed crop centrally and propel it rearwardly as the windrower 10 advances. Rearward of the augers 26, 28 is a rear opening for receiving the crop material and permitting the flow of the crop material to pass to the conditioner roll assembly 30.

In one embodiment, the conditioner roll assembly 30 comprises a pair of front, counter-rotating conditioner rolls 32, 34 and a pair of rear counter-rotating conditioner rolls 36, 38. In some embodiments, the conditioner roll assembly 30 may comprise a single pair of rolls. The conditioner rolls 32-38 may be constructed of hard materials including steel, compressible (e.g., elastomeric) materials, or each pair may be different in material (e.g., steel for the front rolls 32, 34, elastomeric for the rear rolls 36, 38). Also, the rolls 32-38 may be comprised of a smooth surface, a specially-configured surface (e.g., angular protrusions arranged along the roll in a helical pattern, ribbed, etc.), or each pair may be of a different type surface.

Figure 2:
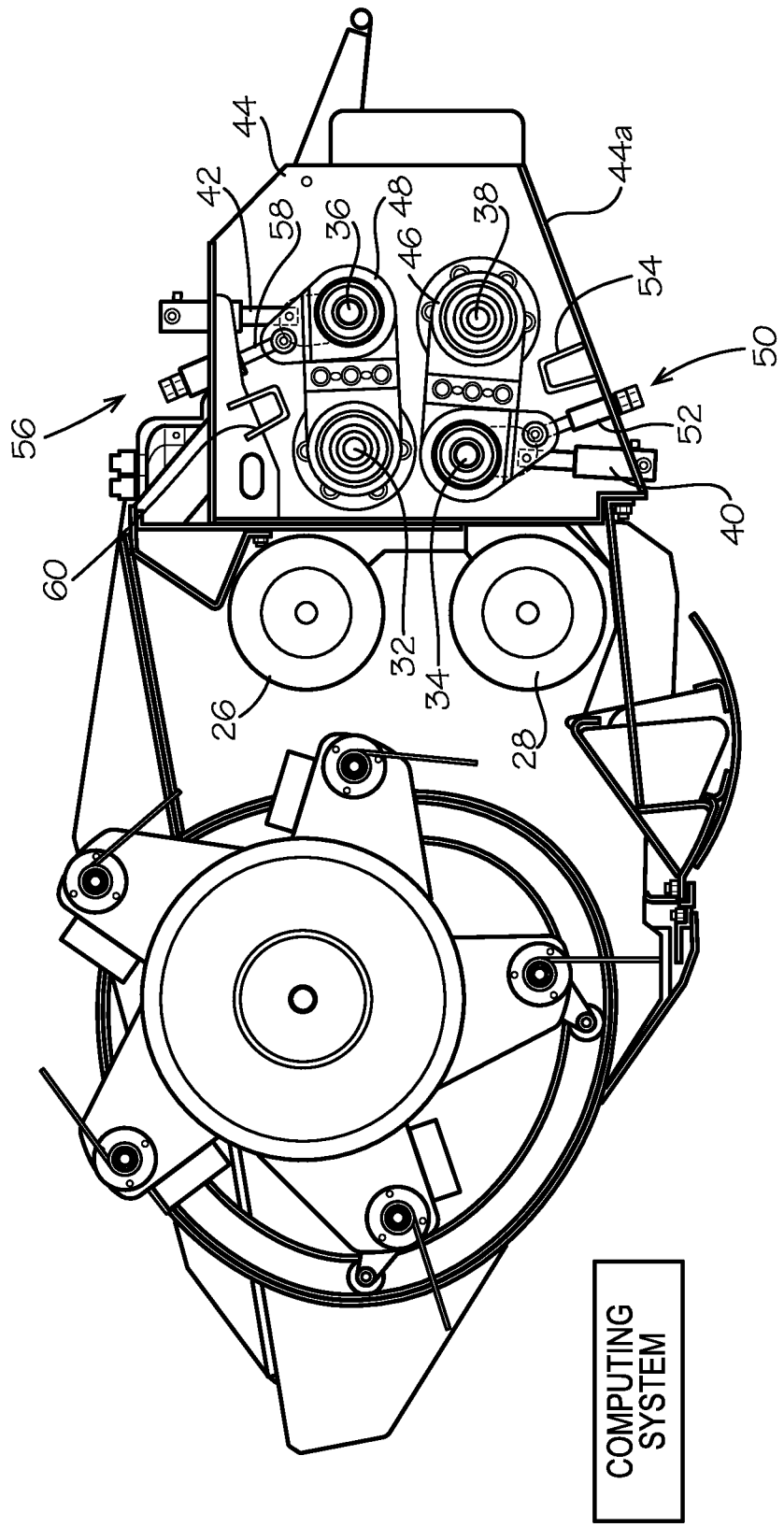
FIG. 2 is a schematic diagram that illustrates, in side elevation, cut-away view, conditioner rolls of a windrower for which an embodiment of a computer-controlled, conditioner roll tensioning system may be implemented.

The front rolls 32, 34 are adapted for relative movement toward and away from each other (e.g., pivotal or radial movement, such as caused via encounters with crop material passing between the rolls 32, 34). The rear rolls 36, 38 are likewise adapted for relative movement toward and away from each other. With continued reference to FIG. 1 and referring also to FIG. 2, the front rolls 32, 34 are mounted in a manner that the lower front roll 34 can move toward and away from the upper front roll 32 to limited extent while the position of the upper roll 32 remains fixed. This relationship may be reversed in some embodiments, or movement of both rolls 32, 34 may be enabled in some embodiments. The upper rear roll 36 is mounted in a manner to move toward and away from the lower rear roll 38 to a limited extent while the position of the lower rear roll 38 remains fixed. This relationship may be reversed in some embodiments, or movement of both rolls 36, 38 may be enabled in some embodiments. Tension is applied to the rolls 32-38 in one embodiment by four single-acting hydraulic cylinders 40 (e.g., one shown for one side of the front rolls 32, 34, with the opposing side cylinder obscured from view) and 42 (e.g., similarly, one shown for one side of the rear rolls 36, 38, with the opposing side cylinder obscured from view). In some embodiments, additional hydraulic cylinders or pairs of hydraulic cylinders may be used per roll. Hydraulic cylinders 40 are used for applying tension (e.g., resistance to movement, such as caused by crop movement between the rolls 32, 34) to the front rolls 32, 34, while the cylinders 42 are used for applying tension to the rear rolls 36, 38. Front cylinders 40 are located at opposite ends of lower front roll 34, while rear cylinders 42 are located at opposite ends of upper rear roll 36. More specifically, each front cylinder 40 is secured to a corresponding end wall 44 along the lower front extremity thereof and projects upwardly therefrom for pivotal connection with the lower front extremity of support assembly 46 (also referred to as a pivot assembly or merely, pivot). Correspondingly, each rear cylinder 42 is secured to the upper rear extremity of the end wall 44 and projects downwardly therefrom for pivotal connection with the upper rear extremity of support assembly 48. Thus, the cylinders 40, 42 comprise part of a tension mechanism that resists movement of the rolls 32-38 as crop material passes between each pair, and hence resists their separation.

The front rolls 32, 34 are provided at their opposite ends with an adjustable stop structure 50 for limiting movement of the lower front roll 34 upwardly toward upper front roll 32. In one embodiment, the stop structure 50 includes an elongated member 52 that passes through a hole (not shown) in an outturned flange 44a of the lower edge of the end wall 44 and connects at its upper end to the lower front extremity of the support assembly 46. In the opposite direction, to limit the extent of downward movement of lower front roll 34 away from upper front roll 32, a stop bracket 54 is disposed to underlie and abut the lower edge of support assembly 46. A similar stop structure and stop bracket are provided on the right end of header 20 with similar functionality. An adjustable stop structure 56 is also provided for adjustably limiting the movement of upper rear roll 36 in a downward direction toward lower rear roll 38. Such adjustable stop structure 56 is identical to stop structure 50, and includes an elongated member 58. To limit movement of upper rear roll 36 away from lower rear roll 38, a stop bracket 60 similar to stop bracket 54 is disposed above support assembly 48 for engagement with the upper extremity of the assembly 48 when the upper rear roll 36 is raised to its full extent and away from lower rear roll 38. Both ends of upper rear roll 36 are provided with adjustable stop structures and stop brackets. As the configuration of the conditioner roll assembly 30 (FIG. 1) is well-known, further discussion of the same is omitted here for brevity. Additional detail on the structure and manner of operation may be found in commonly assigned U.S. Pat. No. 8,166,736, which is hereby incorporated by reference in its entirety to the extent not inconsistent with the detailed description of the present application. Note that the tensioning of the conditioner roll assembly 30 is controlled via actuation of the hydraulic cylinders 40, 42 under control of a computing system, as explained further below.

Figure 3:
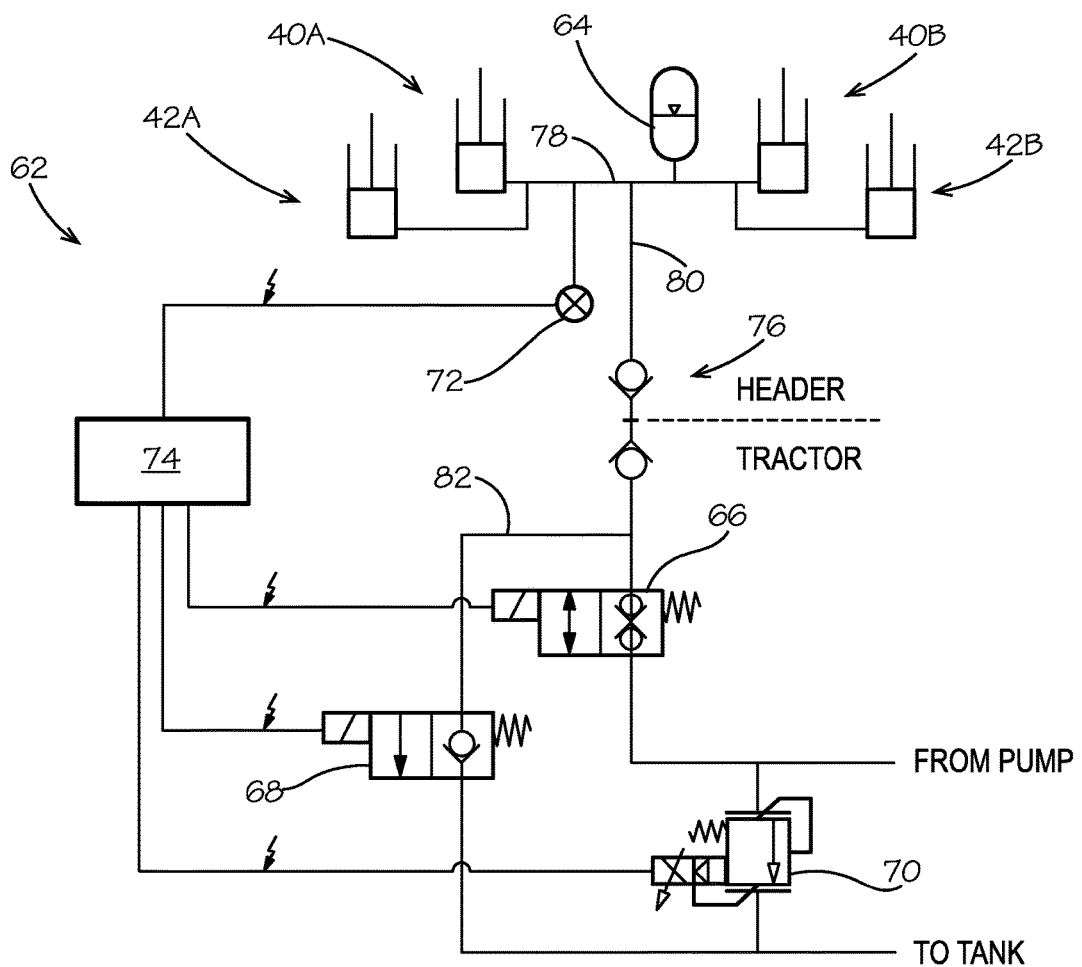
FIG. 3 is a schematic diagram that illustrates an embodiment of a computer-controlled, conditioner roll tensioning system.

FIG. 3 is a schematic diagram that illustrates an embodiment of a computer-controlled, conditioner roll tensioning system 62. In some embodiments, the computer-controlled, conditioner roll tensioning system 62 may contain additional or fewer components to achieve similar functions. In the depicted example of FIG. 3, with continued reference to FIGS. 1-2, the computer-controlled, conditioner roll tensioning system 62 comprises an electronic, electrical, and/or electromagnetic control component and a hydraulic circuit, the hydraulic circuit comprising a tensioner circuit comprising two pairs of hydraulic cylinders arranged in parallel, including a front pair 40A (for resistance adjustment at one end of the front rolls 32, 34) and 40B (for resistance adjustment at the opposing end of the front rolls 32, 34), and a rear pair 42A (for resistance adjustment at one end of the rear rolls 36, 38) and 42B (for resistance adjustment at the opposing end of the rear rolls 36, 38). The tensioner circuit further comprises one or more pressurized tanks or accumulators, where a single accumulator 64 is shown arranged in parallel with, and hydraulically coupled to, the hydraulic cylinders 40, 42. The tensioner circuit further comprises plural control valves hydraulically coupled to the accumulator 64 and hydraulic cylinders 40, 42, including a pressure increase valve 66, a pressure decrease valve 68, and an open center valve 70. The electrical, electronic, and/or electromagnetic component includes the actuators for each of the control valves 66-70, a pressure sensor (e.g., pressure transducer) 72, and a computing system 74. Also shown as part of the hydraulic circuit is a quick coupler assembly 76. The quick coupler assembly 76 enables the header 20 (FIG. 1) to be detachably coupled to the tractor (driving) portion of the windrower 10. Additional components of the hydraulic circuit may include a centrifugal pump and reservoir.

Explaining the components further, the hydraulic cylinders 40, 42 may be configured as single-acting, piston-type cylinders. In some embodiments, double-acting hydraulic cylinders may be used. Though shown with four hydraulic cylinders 40A, 40B, 42A, 42B (or two pairs, one pair for the front, one pair for the back), the two outer cylinders 42A, 42B depicted in FIG. 3 may be omitted in a single pair system, or in some embodiments, additional hydraulic cylinders or pairs of hydraulic cylinders may be used for roll pair 32, 34 and/or roll pair 36, 38.

The accumulator 64 is disposed in a branch 78 that tees from a main hydraulic line 80, and is used to provide a yieldable, cushioning effect to the tensioning mechanism. The branch 78, main 80, and other lines of the hydraulic circuit may be comprised of hoses, tubing, or other types of conduit for hydraulic fluid, with a construction of metal or polymer or elastomeric material. In some embodiments, the accumulator 64 may be replaced with a device or devices of similar functionality, such as a linkage and spring system.

The control valves 66 and 68 are for enabling an increasing in pressure (e.g., to charge the accumulator 64) and reduction in pressure (e.g., to discharge the pressure from the accumulator 64), respectively. The open center valve 70 is for enabling, while open, circulation between the pump, the valve 70 and the reservoir during steady state operation (e.g., while the system operates to maintain the hydraulic pressure at or proximal to a hydraulic pressure set-point), and for stopping (when closed) the circuitous flow between the pump, the valve 70, and the reservoir and enabling accumulator charging (e.g., through the opening of the pressure increase valve 66) via flow through the main 80 and branch 78 lines. During operations where pressure is being reduced, the open center valve 70 is open, and the pressure decrease valve 68 is actuated to enable a decreased charge at the accumulator 64 via the branch 78, main 80, and discharge 82 lines to the tank or reservoir. The open center valve 70 may be also configured for relief valve functionality, though in some embodiments, such functionality may be achieved via a separate hydraulic component. The pressure increase valve 66 is disposed in the main line 80 between the pump (not shown) and the branch line 78. The pressure decrease valve 68 is disposed in a discharge line 82 that tees from the main line 80 and terminates at a tank or reservoir (not shown).

In one embodiment, each of the control valves 66, 68, and 70 is a 2-position control valves with, for instance, a poppet or spool assembly that couples to and physically controls a disc, ball, globe, etc. to control the hydraulic fluid flow through an orifice. Control of the poppet or spool may be achieved by a respective actuator coupled to the respective valves 68-70 that is powered by one of a variety of different motive forces, including electrical, magnetic, electromagnetic, hydraulic, or pneumatic energy sources. In the depicted embodiment, each actuator comprises an electrical actuator, such as a solenoid valve, though a motor or other known mechanisms of control may be used in some embodiments. In some embodiments, the control valves 66, 68, and 70 may be proportional valves, each having a modulating function based on the value of an inputted control signal (e.g., 4-20 mA, 5-15 psi, etc.) to the respective actuator.

Note that reference herein to signaling of the control valves may refer to application of a control signal (e.g., having a defined voltage or current level) to activate a normally-closed valve (e.g., in the case of the pressure increase valve 66 and pressure decrease valve 68) to enable the valve to open or a normally-open valve (e.g., in the case of the open center valve 70) to enable the valve to close. In some embodiments, the non-activated state (normally open, normally closed) of the valve may be reversed. In some embodiments, signaling may refer to a proportional level of voltage or current to cause the valve to open or close a proportional amount based on the level among a range of levels of voltage or current.

The pressure sensor 72 is shown coupled to the branch line 78, and is used to sense the hydraulic pressure experienced by the accumulator 64. In some embodiments, other mechanisms for sensing pressure may be used at the same or different locations.

The computing system 74 is communicatively coupled to at least the actuators of the control valves 66-70 and the pressure sensor 72, as signified by the lightning bolt symbol at the respective connections. In one embodiment, the connections may be achieved according to a CAN system, such as a network in conformance to the ISO 11783 standard, also referred to as "Isobus". In some embodiments, other proprietary or public network configurations may be used to enable signaling or communications, and in some embodiments, all or a portion of the communications may be achieved wirelessly (e.g., via Bluetooth, 802.11, near field communications (NFC), etc.). The computing system 74 may be configured as a processor-based (or multiple processors-based) device, such as an electronic control unit (ECU). In some embodiments, the functionality of the computing system 74 may be achieved via a distributed network of computing devices (e.g., ECUs), including according to a peer-to-peer or master-slave mechanisms of control. The computing system 74 may be configured for additional inputs and/or outputs, including input from, or outputs to, other electronic control units for the same system or other sub-systems (e.g., flotation header pressure control sub-system, forward and reverse header sub-systems, etc.) coupled to the CAN system, inputs from or outputs to one or more user interfaces, inputs from additional sensors, and or outputs to one or more machine controls, etc. In one embodiment, all of the functionality of the computing system 74 resides in the windrower 10 (FIG. 1). In some embodiments, all or a portion of the functionality of the computing system 74 resides external to the windrower 10, including at one or more computing devices of a farm computing system, manufacturer's computing system, manufacturer's representative computing system, an ISP, a Cloud provider's cloud platform, a cellular providers computing platform, among others.

In one example operation, the computing system 74 receives an inputted value for the hydraulic pressure set-point for the hydraulic circuit. The inputted value may be a default value (e.g., minimum operating pressure to provide minimum (adequate) tensioning and hence adequate crop conditioning) received from memory, or a value inputted by an operator at a user interface coupled to or in communication with the computing system 74. For instance, the operator may desire a change in the conditioning of the swath or windrow, and invoke, on a display screen, data on the current sensed operating pressures for the conditioner roll assembly 30 (FIG. 1). The computing system 74 may render a visual indication of distinctive ranges (e.g., low, preferred, high, or other delineation of ranges) of operating pressures and the present operating pressure for the tensioning mechanism (as acquired from the pressure sensor 72) or derived from other sensed parameters. The display screen may also show options for increasing or decreasing the conditioner roll pressures, which the operator may select to establish the set-point as described further below in association with FIG. 5. The computing system 74 receives input from the pressure sensor 72 (e.g., continually, or at periodic or aperiodic intervals) and compares the current hydraulic pressure value with the hydraulic pressure set-point. If the current pressure value is less than the set-point, then the computing system 74 sends signals to the open center valve 70 (i.e., the actuator), which causes the valve 70 to close, and sends signals to the pressure increase valve 66 (i.e., the actuator), which causes the valve 66 to open. Consequently, hydraulic fluid flows from the pump, through the control valve 66 along the main line 80 to the branch line 78. The hydraulic fluid flow to the branch line 78 causes an increase in pressure at the hydraulic cylinders 40, 42. The increase in pressure at the hydraulic cylinders 40, 42 causes an increase in resistance to movement of the rolls 32-38 via their connection to the respective front and rear support (pivot) assemblies 46, 48 and a concomitant increase in the pressure at the accumulator 64 until the pressure is equal to the hydraulic set-point (as sensed by the pressure sensor 72 and inputted to the computing system 74).

If the current (sensed) hydraulic pressure value is more than the hydraulic pressure set-point, then the computing system 74 sends signals to the pressure decrease valve 68 (assuming a normally-open open center valve 70, though in some embodiments, a signal may be sent if the open center valve is normally-closed), which causes the valve 68 to open. Consequently, hydraulic fluid flows from the accumulator 64 and the branch line 78 (e.g., through the main line 80) and through the control valve 68 along the discharge line 82 to the tank or reservoir. The loss of pressure at the hydraulic cylinders 40, 42 results in a decrease in resistance to movement of the rolls 32-38 via their connection to the respective front and rear support assemblies 46, 48, and a concomitant decrease in the pressure at the accumulator 64 until the hydraulic pressure is equal to the hydraulic pressure set-point (as sensed by the pressure sensor 72 and inputted to the computing system 74).

Although the above-description associated with FIG. 3 focuses on automatic tensioning of the conditioner rolls of the conditioner roll assembly 30 in response to a comparison of sensed hydraulic pressure to hydraulic pressure set-points, it should be appreciated by one having ordinary skill in the art in the context of the present disclosure that certain embodiments of the computer-controlled, conditioner roll tensioning system 62 also function to provide benefits ancillary to the tensioning function. For instance, the continual or regular feed of sensed hydraulic pressure data from the pressure sensor 72 to the computing system 74 enables the detection and automatic correction of leaks in the hydraulic circuit (e.g., in a manner transparent to the operator, though in some embodiments, the operator may be alerted of these conditions and/or prompted to intervene). For instance, deviations from the hydraulic pressure set-point may be the result of leakage of hydraulic fluid, which may be manifested as a decrease in sensed hydraulic pressure. The computing system 74 corrects for the deviation in the manner described above (e.g., actuating the pressure increase valve 66 and open center valve 70). If leakage is a persistent problem, logic (e.g., software) in the computing system 74 may alert the operator of the condition via a user interface (e.g., display screen, audible alert, tactile alert, etc.) for further investigation. In one embodiment, the computing system 74 accesses an internal clock (e.g., using hardware, software, or a combination of hardware and software) or an otherwise accessible clock (e.g., using GNSS time clock functionality of a GNSS receiver coupled to a network that includes the computing system 74) and also monitors the pressure sensor 72 to determine whether the hydraulic pressure has decreased to a threshold value (or decreased over a threshold range) relative to the hydraulic pressure set-point a predetermined quantity of times (e.g., more than twice) over a predetermined interval of time (e.g., over an hour interval), and responsively, alerts the operator. In some embodiments, the computing system 74, along with accessing the internal or accessible clock, monitors how often the computing system 74 has signaled the pressure increase valve 66 to increase pressure over a predetermined interval of time, and alerts the operator. In some embodiments, an alert may be provided by the computing system 74, with or without a time component, based on comparison of the quantity of actuations for a given field or for certain operations to historical usage or manufacturer or industry standards/specifications.

Further, the computing system 74 automatically accounts for thermal expansion (with or without an associated alert to the operator) within the hydraulic circuit (e.g., within the accumulator 64). That is, hydraulic pressure that is sensed by the pressure sensor 72 (or via other types of sensors, such as a thermocouple, infrared imaging, etc.) and communicated to the computing system 74 as rising above the hydraulic set-point pressure may be automatically compensated for by the computing system 74 signaling the pressure decrease valve 68 to open to enable a discharge of hydraulic fluid (and hence reduce pressure). As indicated above, a visual, audible, and/or tactile alert may be presented to the operator under such conditions.

Also, as set forth above, the computing system 74 is in communication (e.g., over a CAN system) with controllers or devices of other sub-systems (or in some embodiments, may include controllers or functionality thereof for other sub-systems). In one embodiment, the computer-controlled, conditioner roll tensioning system 62 is activated during the header reverse function. For instance, a slug or slugs of crop material may have a size that exceeds the variable gap between the upper and lower rolls of the front and/or rear pair of rolls 32-38, possibly causing header function to stall. One conventional procedure used to address this condition involves an operator causing the windrower 10 (FIG. 1) to stop, backing the windrower 10 up, and selecting a switch to reverse the rotation of the header 20 (e.g., activating the header reverse function) to unplug the header 20 (FIG. 1). For instance, in rotary style headers, activation of the header reverse function causes the entire header to run backwards (e.g., the conditioner, cutting discs, augers, cages, etc.). In sickle/auger style headers, activation of the header reverse function causes the conditioners and augers to run in reverse (though not the reel). In one embodiment, the reverse operation is implemented via stroking a variable displacement, closed-circuit pump swashplate in the opposite direction from what is used during normal operations, as is known. One shortcoming to the manual procedure is that operators may neglect to manually build conditioner roll pressure after clearing a plugged header, which leads to unconditioned crop and uneven crop drydown in the same field. In certain embodiments of the computer-controlled, conditioner roll tensioning system 62, the computing system 74 receives a signal produced from activation of the header reverse function (e.g., receive from a switch or controller), and responsive to receiving the signal, signals the pressure decrease valve 68 to open, which enables the reduction of pressure and discharge of hydraulic fluid flow to the tank or reservoir. When the computing system 74 receives an instruction to close (e.g., by the operator, the system, etc.), the computing system 74 signals the pressure decrease valve 68 to close. Upon receiving an indication of forward operation of the header 20 (e.g., via signaling from a switch or controller), the computing system 74 signals the pressure increase valve 66 to open, enabling hydraulic fluid flow to the accumulator 64 and branch line 78, which results in pressure returned to the hydraulic cylinders 40, 42 and tensioning pressure to the conditioner roll assembly 30. The computing system 74 signals the pressure increase valve 66 to close upon an indication that the hydraulic pressure is at set-point (e.g., as monitored from the pressure sensor 72) and signals the open center valve 70 to open to enable circuitous flow between the pump and reservoir via the open center valve 70. One benefit of the computer-controlled, conditioner roll tensioning system 62 to the header reverse function is that the conditioner roll pressure is automatically reduced (e.g., without additional user interaction) upon activation of the header reverse function, making it easier to unplug the header. Another benefit of the computer-controlled, conditioner roll tensioning system 62 to the header reverse function is that the risk of the operator neglecting to build-up the hydraulic pressure to the conditioner roll hydraulic circuit is mitigated or eliminated in view of the automatic nature of the pressure-recharging feature.

In one embodiment, the computing system 74 may receive inputs from a switch (or controller) that activates a dump mode for the header floatation pressure sub-system. Digressing briefly, the dump mode may be activated from the cab of the windrower 10 (FIG. 1) by the operator (e.g., via selection of a switch) to relieve the hydraulic pressure in the header flotation circuit of the windrower tractor. The dump mode is activated as a prerequisite to removing the header from the windrower tractor. It is desirable to also relieve the conditioner roll pressure prior to removing the header to prevent the trapped pressure from making it difficult to re-connect. Further description of an example of flotation pressure control may be found in commonly-assigned U.S. Pat. No. 9,043,955, which is incorporated herein by reference in its entirety to the extent not inconsistent with the present application. The conventional procedure for implementing the dump mode should involve the operator opening a shutoff valve at the header, and selecting a switch to activate a pressure decrease valve until the gauge at the header reads zero pressure, thus relieving the conditioner roll pressure. The conventional procedure also involves the operator activating the dump mode to bleed off the hydraulic pressure in the flotation circuit, and then the operator can head back out of the cab to unhook the header. However, operators sometimes forget to bleed off the conditioner roll pressure, which adds difficulty to the process. Further, upon reconnecting the header, the operator may neglect to build up the hydraulic pressure for the tensioner rolls, which may lead to unconditioned crop and/or uneven crop dry-down in the same field.

In contrast, the computer-controlled, conditioner roll tensioning system 62 removes or mitigates the human-error aspect to this procedure by automatically activating the control valves (e.g., pressure decrease valve 68) to bleed the pressure off from the tensioning circuit of the conditioner roll assembly 30 responsive to receiving an indication of a flotation pressure dump mode operation (e.g., responsive to receiving a signal from activation of the dump mode switch by an operator). The computing system 74 signals the pressure decrease valve 68 to close when instructed to do so (e.g., by the operator or the system). Further, the computing system 74 automatically (e.g., without the operator actually manually initiating) signals the pressure increase valve 66 to open based on termination of the dump mode signal and responsive to receiving an indication that the header 20 (FIG. 1) is engaged in the forward direction (e.g., receiving a signal from activation of a header forward function switch). The activation of the pressure increase valve 66 (and closing of the open center valve 70) enables hydraulic fluid to be used to recharge the accumulator 64 to the hydraulic pressure set-point. Upon an indication from the pressure sensor 72 that the hydraulic set-point pressure has been reached, the computing system 74 signals the pressure increase valve 66 to close (and the open center valve 70 to open). In other words, the computer-controlled, conditioner roll tensioning system 62 automatically builds the hydraulic pressure back up to operating conditions without the operator having to be conscious of the event, enabling operation of the header with at least a minimum suitable pressure in the conditioner roll assembly 30.

Figure 4:
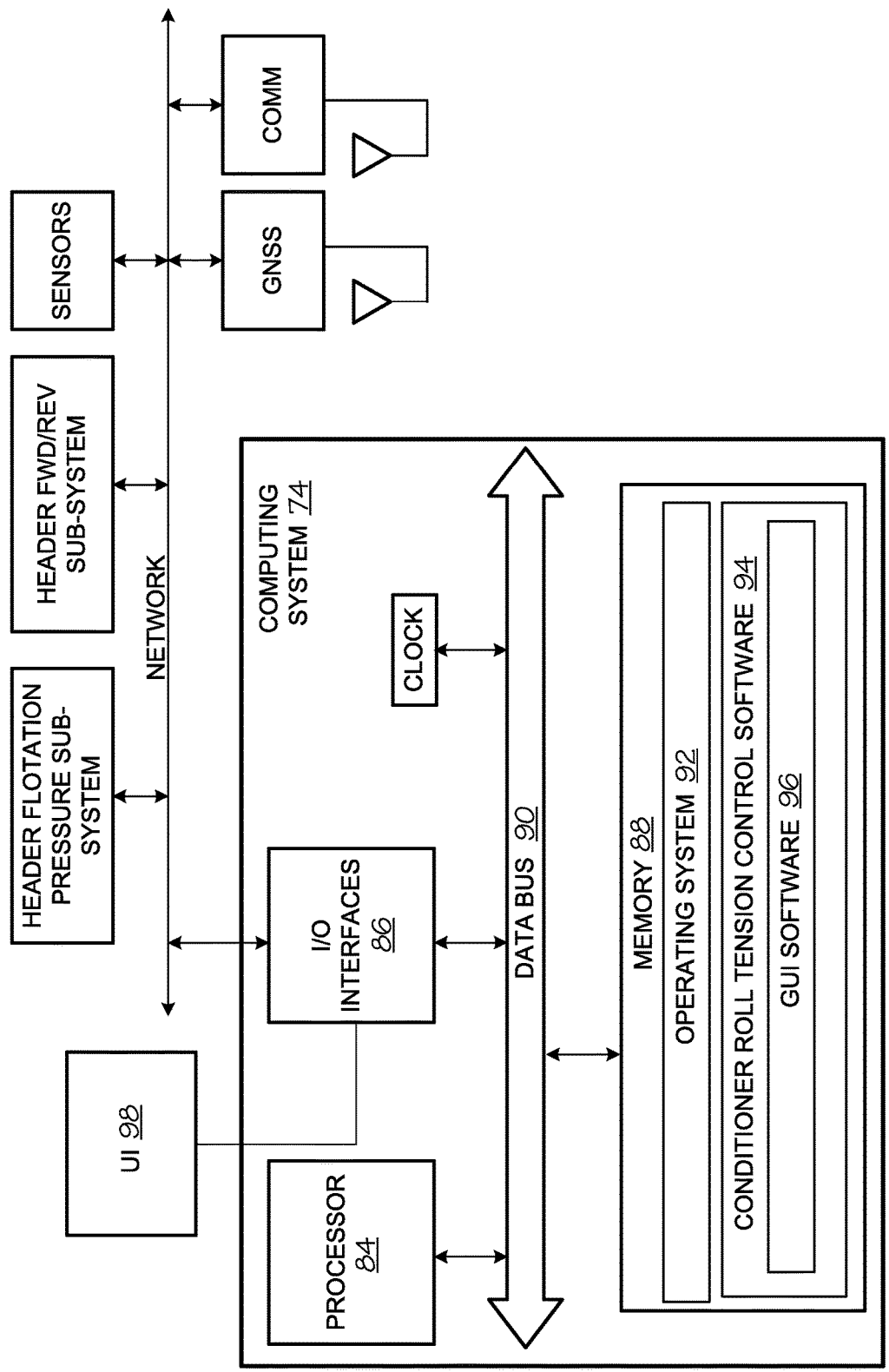
FIG. 4 is a block diagram that illustrates an embodiment of an example computing system and associated network used in the computer-controlled, conditioner roll tensioning system of FIG. 3.

Having described certain embodiments of a computer-controlled, conditioner roll tensioning system 62, attention is directed to FIG. 4, which illustrates an embodiment of an example computing system 74 and associated network. One having ordinary skill in the art should appreciate in the context of the present disclosure that the example computing system 74 is merely illustrative, and that some embodiments of computing systems may comprise fewer or additional components, and/or some of the functionality associated with the various components depicted in FIG. 4 may be combined, or further distributed among additional modules and/or computing devices (e.g., plural ECUs), in some embodiments. It should be appreciated that, though described in the context of residing in the windrower 10 (FIG. 1), in some embodiments, one or more of the functionality of the computing system 74 may be implemented in a computing device or devices located internal and external to the windrower 10 or completely external to the windrower 10, as described above. The computing system 74 is depicted in this example as a computer device (e.g., an electronic control unit or ECU), but may be embodied as a programmable logic controller (PLC), field programmable gate array (FPGA), application-specific integrated circuit (ASIC), among other devices. It should be appreciated that certain well-known components of computer systems are omitted here to avoid obfuscating relevant features of the computing system 74. In one embodiment, the computing system 74 comprises one or more processors, such as processor 84, input/output (I/O) interface(s) 86, and memory 88, all coupled to one or more data busses, such as data bus 90. The memory 88 may include any one or a combination of volatile memory elements (e.g., random-access memory RAM, such as DRAM, and SRAM, etc.) and nonvolatile memory elements (e.g., ROM, Flash, hard drive, EPROM, EEPROM, CDROM, etc.). The memory 88 may store a native operating system, one or more native applications, emulation systems, or emulated applications for any of a variety of operating systems and/or emulated hardware platforms, emulated operating systems, etc. In the embodiment depicted in FIG. 4, the memory 88 comprises an operating system 92 and conditioner roll tension control software 94. The conditioner roll tension control software 94 further comprises graphical user interface (GUI) software 96 that presents feedback of hydraulic operating pressure, hydraulic set-point pressure, and set-point adjustment button icons for enabling manual adjustment by the operator of the hydraulic pressure set-point. In some embodiments, the GUI software 96 may also be configured to present alerts to the operator (e.g., of leakage, thermo-expansion, etc.). It should be appreciated that in some embodiments, additional modules (e.g., browser, or if located remotely, web-host network software, guidance software, communications software, etc.) or fewer software modules (e.g., combined functionality, omitted functionality) may be employed (or omitted) in the memory 88 or used in additional memory. In some embodiments, a separate storage device may be coupled to the data bus 90 (or to a CAN bus (depicted in FIG. 4 as NETWORK) or other network via I/O interfaces 86), such as a persistent memory (e.g., optical, magnetic, and/or semiconductor memory and associated drives).

The conditioner roll tension control software 94 comprises executable code that receives and processes plural inputs, and outputs control signals (e.g., on/off signals, proportional control signals) to the control valves 66-70. As set forth above, the conditioner roll tension control software 94 receives inputs from various devices, including current hydraulic pressures received from (or polled from) the pressure sensor 72, inputs from values stored in memory (e.g., minimum conditioner roll hydraulic pressure set-points corresponding to conditioner roll tensioning, conditioner roll hydraulic pressure set-points from field maps, historical data, etc.), hydraulic pressure set-point values entered at a user interface, signals indicating activation of switches and/or controller signals associated with header flotation pressure sub-system or functionality (e.g., dump mode activation) and header forward and reverse sub-system or functionality. In some embodiments, the aforementioned values may be derived from other parameters received at the computing system 74. The GUI software 96 renders one or more GUIs on a display screen in the cab (or on a computer device display screen remote from the windrower 10, FIG. 1) that provides feedback to the operator of hydraulic pressures sensed by the pressure sensor 72, hydraulic pressure set-points, among other information, and mechanisms (e.g., button icons) that enable the operator to make adjustments to the tensioning of the conditioner roll assembly 30 (FIG. 1).

Execution of the conditioner roll tension control software 94 (and associated GUI software 96) may be implemented by the processor 84 under the management and/or control of the operating system 92. The processor 84 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 74.

The I/O interfaces 86 provide one or more interfaces to the CAN bus (NETWORK) and/or other networks. In other words, the I/O interfaces 86 may comprise any number of interfaces for the input and output of signals (e.g., comprising analog or digital data) for conveyance of information (e.g., data) over one or more networks. The input may comprise input by an operator (local or remote) through a user interface 98, input from switches and/or controllers from the cab or from other locations on the windrower 10 (or header 20) of FIG. 1, input from sensors (e.g., pressure sensor 72, etc.), input from communications components (COMM) on the CAN or other network (e.g., radio modem, cellular modem, etc.), input from GNSS (global navigation satellite systems) components (e.g., a GNSS receiver) coupled to the CAN or other network, input from storage devices (e.g., memory, removable storage, persistent storage, etc.) coupled to the CAN or other network, among other devices. The user interface 98 includes one or any combination of a keyboard, joystick (e.g., with tactile motor), steering wheel, headset, mouse, microphone, display screen, touch-type or otherwise, among other types of input devices. Outputs may include signals to actuate the actuators of the control valves 66-70, among other actuable devices.

When certain embodiments of the computing system 74 are implemented at least in part as software (including firmware), as depicted in FIG. 4, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing system 74 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
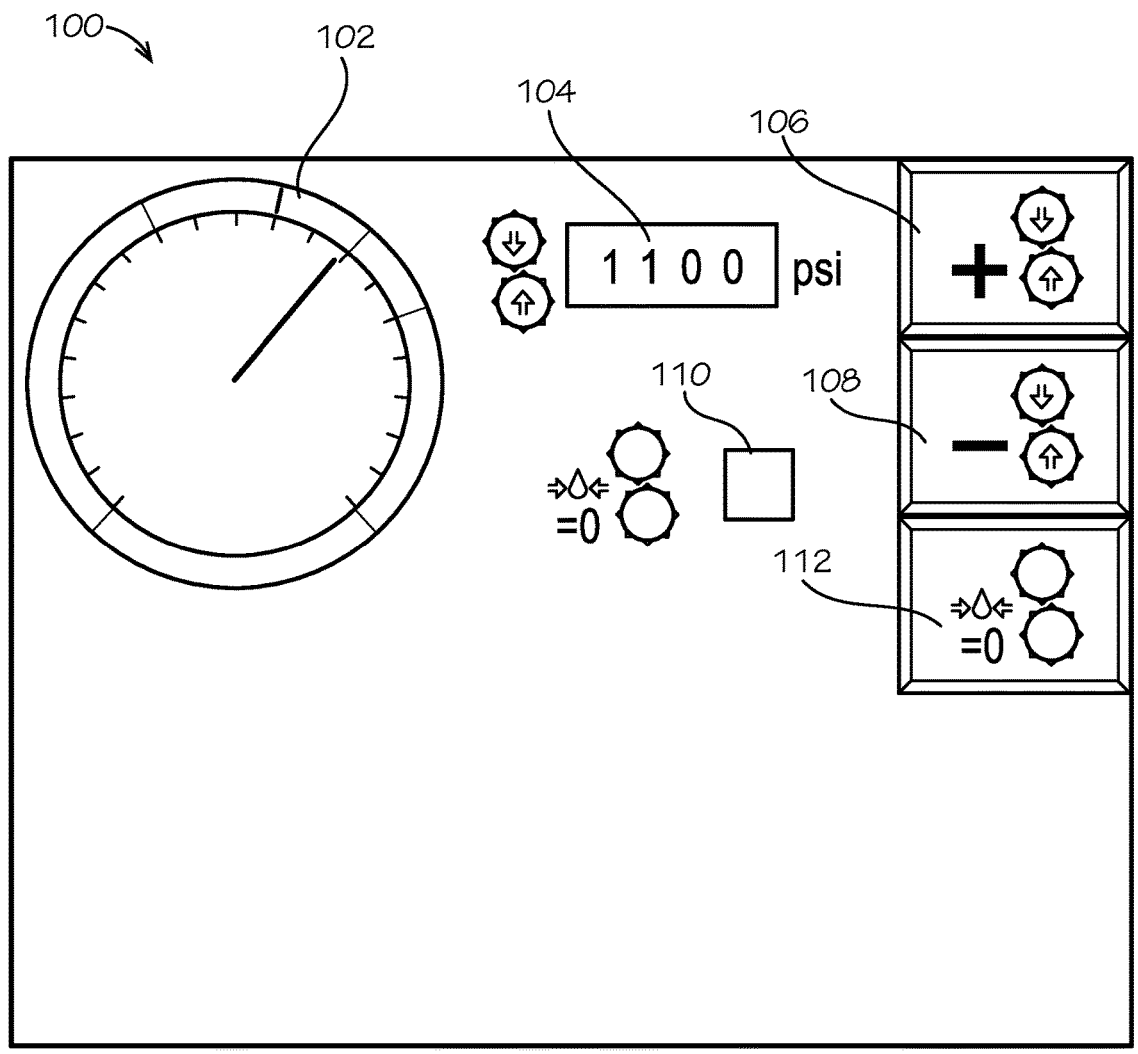
FIG. 5 is a screen diagram that illustrates an embodiment of an example graphical user interface that is used in an embodiment of an example computer-controlled, conditioner roll tensioning system.

FIG. 5 is a screen diagram that illustrates an embodiment of an example graphical user interface (GUI) 100 that may be rendered by the GUI software 96 on the user interface 98 (FIG. 4). It should be appreciated that the GUI 100 is merely illustrative of one mechanism to convey information, and that some embodiments may use a different style, format, and/or other graphics (or no graphics) and hence are contemplated to be within the scope of the disclosure. The GUI 100 comprises a graphic pressure gauge 102, somewhat similar to an analog pressure gauge, that conveys the current hydraulic pressure in the branch line 78 (e.g., at the accumulator 64) of the hydraulic circuit shown in FIG. 3. In one embodiment, the graphic pressure gauge 102 may visually delineate one or more hydraulic pressure ranges of varying operational preference (e.g., preferred or recommended by the manufacturer as suitable and less suitable operating ranges), though some embodiments may omit such delineations. In the depicted embodiment, the ranges are visually distinguished by color, with (from left to right underneath the gauge) a first range (using an analog clock analogy) from approximately 8:00 to 11:00, a second range from approximately 11:00 to 1:00, a third range from approximately 1:00 to 2:00, and a fourth range from approximately 2:00 to 4:00. The first and third ranges may be depicted in yellow, representing acceptable or minimum operating ranges, which bound the second range, which is a preferred operating range. The fourth range may be a range within which the manufacturer may consider excessive for crop conditioning (e.g., excessive maceration of the crop due to excessive tension pressure). Other mechanisms for visual distinction include the presentation of warning icons, green-means-go icons, etc. Conditioner roll hydraulic set-point window 104 corresponds to an interface for visually presenting to an operator a hydraulic pressure set point (e.g., in PSI, though other units may be used) for the front and rear conditioner rolls 32-38, as suggested to the operator by the adjacent conditioner roll graphic. For instance, for the front and rear roll pairs in this example, the tensioning pressure has a hydraulic set-point of 1100 psi as shown in the window 104. Adjustments to the set-points may be achieved by an operator selecting directly on the screen (for touch-type configurations) or indirectly (e.g., via selection of a corresponding button on a handle or by manipulating a cursor on the screen) the button icons 106 (e.g., for increasing the hydraulic set-point pressure) and 108 (for decreasing the hydraulic set-point pressure). The dump roll pressure window 110 comprises a checkbox to dump the roll pressure without having to change the set-point. When the window 110 is not checked, the pressure is adjusted to match the set-point and when the window 110 is checked, the pressure is set to zero (e.g., the system ignores the set-point and bleeds off all of the pressure) as depicted in this example. A corresponding graphic adjacent the window 110 suggests the functionality. A button icon 112 is used to check the window 110. Note that the GUI 100 is merely illustrative, and the same functionality may be achieved using other GUI features and/or additional or fewer features may be presented in some embodiments.

Figure 6:
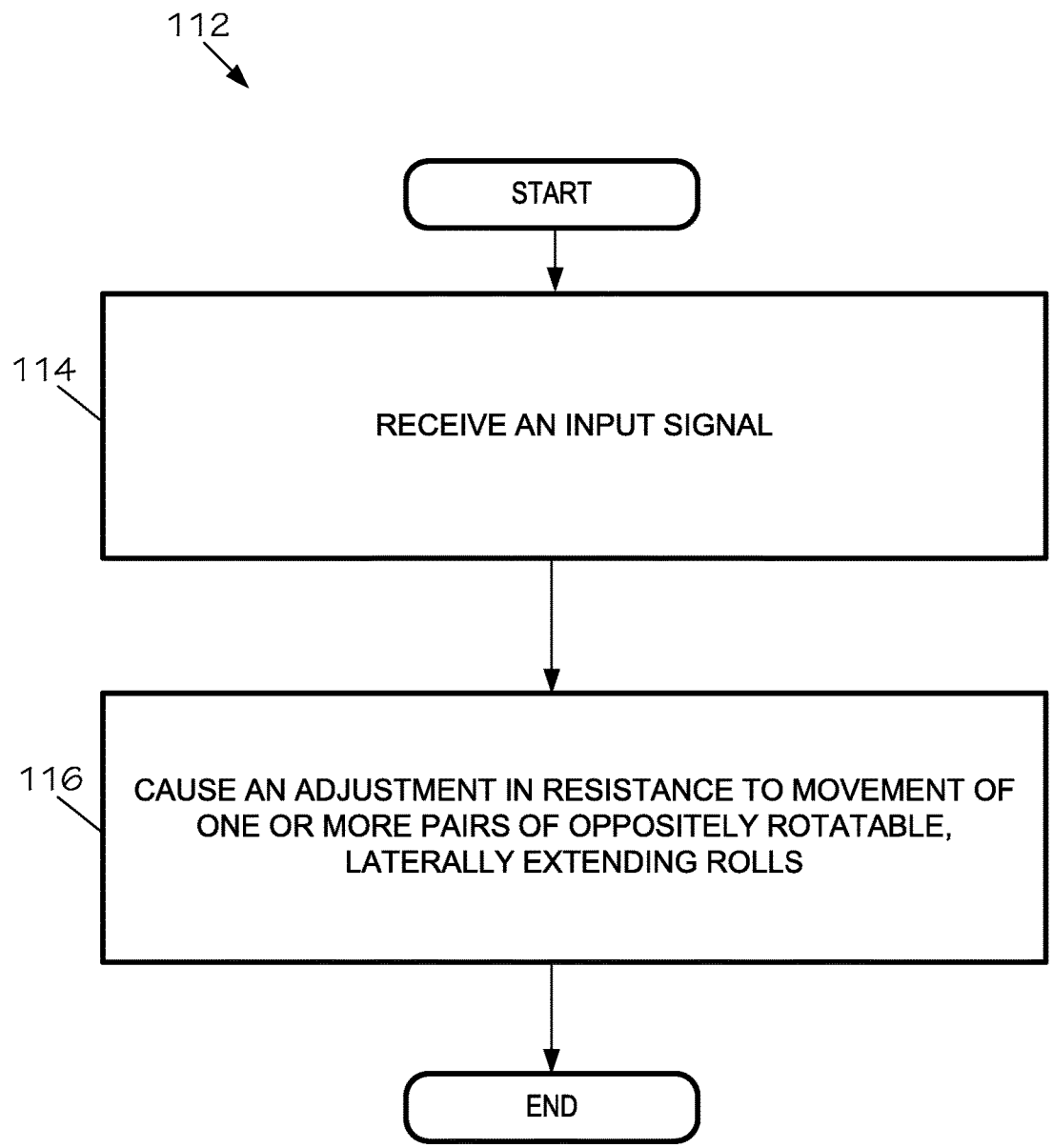
FIG. 6 is a flow diagram that illustrates an embodiment of an example computer-controlled, conditioner roll tensioning adjustment method.

In view of the above description, it should be appreciated that one embodiment of an example computer-controlled, conditioner roll tensioning adjustment method 112, depicted in FIG. 6 (and implemented in one embodiment by the computing system 74), comprises receiving an input signal (114); and based on receipt of the input signal, causing an adjustment in a resistance to movement of one or more pairs of oppositely rotatable, laterally extending rolls (116). In one embodiment, causing the adjustment comprises, for each pair, actuating one or more pairs of hydraulic cylinders to adjust the resistance to movement of the at least one of the rolls of the respective pair of rolls by sending signals to one or more of plural control valves hydraulically coupled to the one or more pairs of hydraulic cylinders.

Note that certain variations to the above-described embodiments may be implemented in some embodiments, as would be appreciated by one having ordinary skill in the art in the context of the present disclosure. For instance, though the computer-controlled, conditioner roll tensioning system 62 (FIG. 3) is described using hydraulic cylinders that are all tied together in parallel flow, in some embodiments, independent control of separate pairs of hydraulic circuits may be achieved using separate hydraulic circuits for the respective front rolls 32, 34 and rear rolls 36, 38, or in some embodiments, separate hydraulic circuits for the opposing ends of each of the roll pairs, or in some embodiments, a combination of the aforementioned variations.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A system, comprising:
one or more pairs of oppositely rotatable, laterally extending rolls, wherein for each pair, at least one of the rolls is moveable relative to the other of the rolls;
a hydraulic circuit, comprising:
a tensioner circuit comprising:
for each pair of rolls, one or more pairs of hydraulic cylinders arranged in parallel, each configured to resist movement of the at least one of the rolls at a respective end of the at least one of the rolls;
an accumulator arranged in parallel to the hydraulic cylinders; and
plural control valves; and
a computing system configured to cause the one or more pairs of hydraulic cylinders to adjust the resistance to movement of the at least one of the rolls of the respective pair of rolls by sending signals to one or more of the plural control valves.

2. The system of claim 1, wherein the computing system is configured to cause, based on sending signals to the one or more of the plural control valves, an increase or decrease in pressure.

3. The system of claim 2, further comprising a pressure sensor configured to sense hydraulic pressure at the accumulator, wherein the computing system is configured to cause the one or more pairs of hydraulic cylinders to adjust the resistance to movement of the at least one of the rolls of the respective pair of rolls based on a difference between the sensed hydraulic pressure and a hydraulic pressure set-point.

4. The system of claim 3, further comprising a user interface having a display screen, wherein the computing system is configured to render on the display screen a visual indication of the sensed hydraulic pressure.

5. The system of claim 4, wherein the visual indication further includes visually distinctive ranges of acceptable operating hydraulic pressures bounded by less acceptable operating hydraulic operating pressures.

6. The system of claim 4, wherein the display screen comprises one or more selectable options to enable an adjustment in the hydraulic pressure set-point, wherein the computing system is configured to cause the one or more pairs of hydraulic cylinders to adjust the resistance to movement of the at least one of the rolls of the respective pair of rolls based on input received for the selectable option.

7. The system of claim 3, wherein the computing system is configured to activate the one or more control valves based on comparing the sensed hydraulic pressure to the hydraulic pressure set-point.

8. The system of claim 7, wherein the computing system is further configured to determine a presence of a leak or thermo-expansion based on the comparison, wherein the computing system is configured to determine the presence of the leak when the hydraulic pressure drops a predetermined amount of times from the hydraulic set-point in a predetermined interval, the control valves are activated a predetermined amount of times in a predetermined interval, based on a historical data, or based on manufacturer or industry specifications.

9. The system of claim 8, wherein the computing system is further configured to present an alert to an operator based on the leak.

10. The system of claim 1, wherein the computing system is further configured to:
receive an indication of a header reverse function;
responsive to receipt of the indication, cause a first control valve of the plural valves to open; and
cause the first control valve to close based on a received instruction.

11. The system of claim 10, wherein the computing system is further configured to:
receive an indication of engagement of the header in the forward direction;
cause a second control valve of the plural valves to open; and
responsive to receiving an indication that the hydraulic pressure in the hydraulic circuit reaches a hydraulic pressure set-point, cause the second control valve to close.

12. The system of claim 1, wherein the computing system is further configured to:
receive a first indication of a flotation pressure dump mode activation;
responsive to receipt of the first indication, cause a first control valve of the plural valves to open; and
cause the first control valve to close based on a received instruction.

13. The system of claim 12, wherein the computing system is further configured to:
receive a third indication of engagement of the header in the forward direction;
cause a second control valve of the plural valves to open response to receipt of the third indication;
receive a fourth indication that the hydraulic pressure in the hydraulic circuit has reached a hydraulic pressure set-point; and
cause the second control valve to close responsive to receipt of the fourth indication.

14. A computer-controlled method for conditioner roll tensioning adjustment in a windrower, the method comprising:
at a computing system, the computing system comprising one or more processor-based electronic control units:
receiving an input signal; and
based on receipt of the input signal, causing an adjustment in a resistance to movement of one or more pairs of oppositely rotatable, laterally extending rolls, wherein causing the adjustment comprises, for each pair, actuating one or more pairs of hydraulic cylinders to adjust the resistance to movement of the at least one of the rolls of the respective pair of rolls by sending signals to one or more of plural control valves hydraulically coupled to the one or more pairs of hydraulic cylinders.

15. The method of claim 14, wherein receiving an input signal comprises receiving input corresponding to sensed hydraulic pressure in the hydraulic circuit.

16. The method of claim 15, wherein sending the signals is based on comparing the sensed hydraulic pressure to a hydraulic pressure set-point.

17. The method of claim 14, further comprising, at the computing system:
   receiving an indication of a header reverse function;
   responsive to receipt of the indication, signaling a first control valve of the plural valves to open;
   signaling the first control valve to close based on a received instruction;
   receiving an indication of engagement of the header in the forward direction;
   signaling a second control valve of the plural valves to open; and
   responsive to receiving an indication that the hydraulic pressure in the hydraulic circuit reaches a hydraulic pressure set-point, signaling the second control valve to close.

18. The method of claim 14, further comprising, at the computing system:
   receiving a first indication of a flotation pressure dump mode activation;
   responsive to receipt of the first indication, signaling a first control valve of the plural valves to open;
   signaling the first control valve to close based on a received instruction;
   receiving a third indication of engagement of the header in the forward direction;
   signaling a second control valve of the plural valves to open response to receipt of the third indication;
   receiving a fourth indication that the hydraulic pressure in the hydraulic circuit has reached a hydraulic pressure set-point; and
   signaling the second control valve to close responsive to receipt of the fourth indication.

19. The method of claim 14, further comprising presenting, by the computing system, for display to an operator a sensed hydraulic pressure, a hydraulic pressure set-point, and selectable options for changing the hydraulic pressure set-point.

* * * * *